United States Patent Office 3,681,194
Patented Aug. 1, 1972

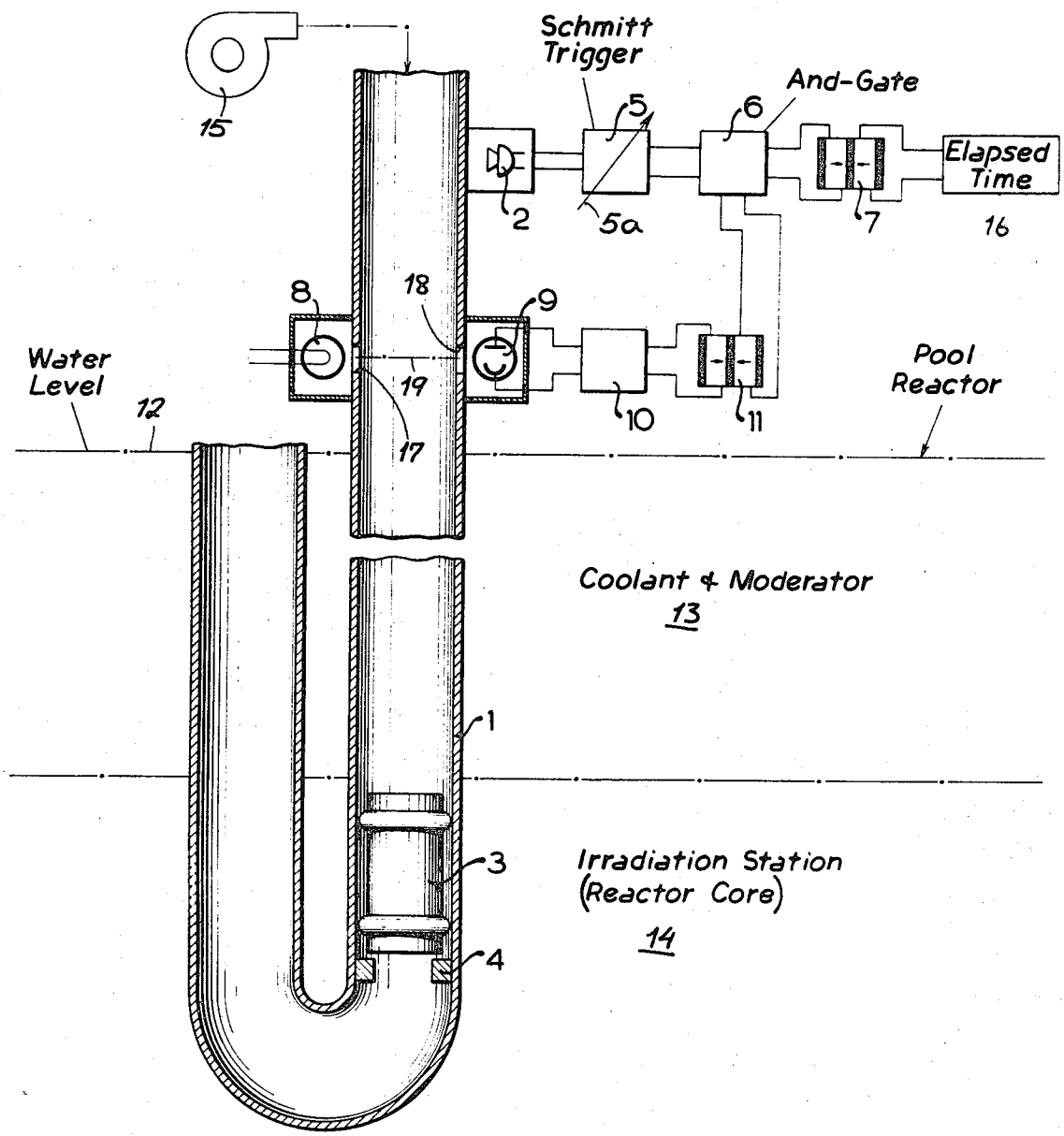

3,681,194
SIGNALING SYSTEM FOR PNEUMATIC INSTALLATIONS IN NUCLEAR REACTORS
Enoui Leopold Dieck, Laurensberg, Germany, assignor to Kernforschungsanlage Julich, Gesellschaft mit beschrankter Haftung, Julich, Germany
Filed Mar. 3, 1969, Ser. No. 803,615
Claims priority, application Germany, Mar. 9, 1968, P 12 84 358.2
Int. Cl. G21c 17/00
U.S. Cl. 176—19                    10 Claims

ABSTRACT OF THE DISCLOSURE

A pneumatic-tube installation for positioning a sample in the flux of a nuclear reactor is provided with a metallic tube extending from a stop for the sample. An electroacoustical transducer, preferably a microphone, is disposed along the tube at a location outside the reactor core to detect the sound wave transmitted along the tube upon engagement of the sample with the stop. The output of the transducer is applied through a variable-threshold (amplitude comparator) trigger circuit (Schmitt trigger) to a switching device whose output, in turn, can initiate a timing cycle. An optical detector ahead of the microphone is connected through an AND-gate designed to enable the switching device so that the system responds only at the sound of impact with the stop.

---

My present invention relates to a signaling system for a pneumatic transfer system installed in a nuclear reactor and, more particularly, to an arrangement designed to provide an output indicative of the proper positioning of a sample in the flux field of such a reactor.

Nuclear reactors are frequently provided with means permitting the insertion into the core or the flux field of the reactor of a sample to be irradiated for precise time periods and then removed for analysis, investigation or subsequent use.

Such installations may comprise pneumatic-tube arrangements, composed of a metal, e.g. aluminum, which extend from the exterior of the reactor at a location outside the flux field into the latter. Specimens are placed in canisters, capsules or cartridges and are inserted into the tube from such external locations via doors or air locks, and are advanced to the irradiating station within the flux field and are withdrawn by pneumatic pressure.

Such systems are most frequently used for investigations of very short-lived radio nuclides because of the convenience with which the capsule can be inserted and removed. In such investigations, the irradiating time, i.e. the length of the period spent by the capsule at the irradiating station, should be known precisely or precisely predetermined for optimum results.

In relatively low-power nuclear reactors, it is possible to provide electrical switches of microswitch type, which are actuated when the capsule reaches its endpoint along the pneumatic tube and is thus positioned by a stop at the irradiating location. In reactors with higher fluxes or high-energy irradiating fields, such relatively simple devices, designed to indicate the fact that the capsule has reached its end position, cannot be used since devices with movable parts are unsuitable in the presence of such fields.

Moreover, the use of insulating synthetic resins in the immediate vicinity of higher energy fluxes is also precluded by irradiation and thermal considerations. Effort to substitute optical switching systems at the irradiating location have also proved to be impractical since such systems substantially invariably must provide optical detectors or light sources in glass envelopes or with glass windows which become blackened and opaque under the conditions prevalent in the irradiating zone.

It has also been suggested to provide gas-pressure switches which are designed to respond to the pressure built up in the pneumatic tube when the capsule has reached its end position at the irradiating zone. The response time of such systems is comparatively greater and has limited their utility. Such systems have shown to respond to pressure waves generated by variable transport speed of the capsule before the capsule has reached its end position. In fact, the problem has become so acute as to lead to the more primitive technique for determining the time at which a radiation is to commence, by calculating the rate at which the capsule moves through the tube and the transit time required. Even this technique is unsatisfactory because of its unreliability and its lack of precision, especially when relatively short-irradiation times are involved. Under such conditions the error in establishing the time at which the capsule reaches its end position may be as great as the total radiation time.

It is, therefore, the principal object of the present invention to provide an improved installation for indicating the arrival of a sample capsule at the irradiating position of a nuclear reactor.

Another object of my invention is to provide an arrangement which overcomes the aforementioned disadvantages and, in cooperation with a pneumatic-tube-sample-positioning system, is capable of indicating the arrival of the sample at the irradiating station.

Still another object of this invention is the provision of improved means, in combination with a pneumatic-tube arrangement of the character described, which is unaffected by the conditions prevalent in the reactor flux and has proportionately its response time, for initiating a timing cycle upon the arrival of the capsule at the irradiating location.

Still further, an object of the invention is to provide a signaling system of the character described which is free from moving parts and is unaffected by the rigorous conditions within the nuclear reactor, and yet can generate an output signal which constitutes an error-free indication of the arrival of the capsule at the irradiating zone of a nuclear reactor.

The present invention is based upon the fact that vibratory waves of an acoustical nature and, usually, audio-frequencies, can be transmitted along a metallic tube at a substantially higher velocity than sound waves in the gas present within such tubes or pressure waves within the gas. In fact, sound waves travel in the capsule-displacing gas within a pneumatic-tube installation for positioning a capsule at the irridiating location with a velocity of about 331 meters per second whereas an acoustical signal transmitted through the tube will travel at 5100 meters per second when the tube is composed of aluminum.

According to the principal feature of the present invention, therefore, a metallic tube, usually of aluminum, constitutes the conveying system for carrying a sample capsule from the exterior of the reactor into its interior and positioning the capsule at the irradiating location, the tube being formed with a stop or abutment at this location which is engageable by the capsule to produce a detectable sound wave or acoustical vibration in the tube; at a location externally of the flux field and, preferably out of the reactor, I provide an electroacoustical transducer in vibration-detecting relationship with the wall of the tube to generate an electrical output upon detection of the sound wave produced by contact between the capsule and the abutment.

The electroacoustical transducer is preferably a microphone of any conventional type, e.g. a sound-powered, dynamic or piezoelectric microphone, and is mounted along the wall of the tube externally thereof at some distance, say 10 meters, from the abutment and has its output connected to a pulse-producing or pulse-forming trigger circuit which, in turn, operates an output element in the form of a switching device.

The switching device, which may be used to initiate a timing cycle (e.g. to trigger an elapse-time meter), may be a relay, but preferably is an electronic switch. Most desirably, the electronic switch includes a flip-flop or bistable triggerable multivibrator controlling the elapsed-time meter. When the tube is composed of aluminum as indicated earlier and the microphone is spaced about 10 meters from the abutment, the transit time for the sound wave along the tube is about 2 milliseconds, while the response time of the microphone and switching device is a fraction thereof.

According to a more specific feature of this invention, the triggering circuit is a conventional variable-threshold (amplitude-comparator type) trigger (Schmitt trigger circuit) designed to respond only to an output from the microphone of a predetermined level, thereby eliminating background noise and preventing premature triggering of the switching device.

To prevent premature energization of the system as a result, for example, of operation of the lock or door of the pneumatic tube through which the capsule is inserted or the sound of the capsule passing the microphone, I have found it desirable to provide an additional switch arrangement between the microphone and the abutment which functions independently of sound wave transmitted along the tube. This auxiliary switching arrangement may be a sensitive or microswitch in the path of the capsule but is preferably an electro-optical system, e.g. lamp-photocell arrangement positioned athwart the tube and designed to detect the actual passage of the capsule therealong, the auxiliary switching arrangement being located externally of the reactor core and in the direction of insertion of the sample capsule. The auxiliary switch arrangement thus produces an enabling signal which allows the microphone to trigger the flip-flop only after the auxiliary has indicated that the capsule is actually en route to its irradiating location, and has passed the microphone.

Still another feature of this invention resides in the use of an AND-gate between the triggering circuit and the bistable multivibrator, one input of the AND-gate being energized by the microphone through the triggering circuit while the other input is operated by the auxiliary switch arrangement. The output of the photocell of the auxiliary switch arrangement may thus be fed to a pulse-generating unit which in turn triggers a flip-flop so as to maintain an enabling potential at the AND-gate for a time sufficient to allow the microphone to respond to the sound wave on impact and complete the input to the AND-gate. The auxiliary switch is most advantageously located immediately adjacent the microphone while the latter is positioned as close to the irradiating location as possible externally of the reactor and its flux field.

The invention is described in greater detail with reference to the accompanying drawing, the sole figure of which is a cross-sectional view through a pneumatic installation for a nuclear reactor, diagrammatically illustrating the system of the present invention.

In the drawing I show a pneumatic sample-irradiating installation as applied to a bulk-shielding reactor of the swimming-pool type wherein a reactor core is immersed beneath a pool of water which constitutes both the coolant and the moderator.

The microphone 2 of the present system is located above the water level 12 of the coolant and moderating bath 13 of water. The reactor core is represented at 14 and lies below the surface of the water pool. The pneumatic tube 1 reaches to the reactor core and an irradiating station at which the sample capsule 3 is retained by an abutment 4 attached to the inner wall of the tube 1. The latter is shown to have two arms reaching above the water level and to be provided with a blower 15 designed to force the capsule 3 along the tube in the usual manner. The inlet door through which the capsule is inserted is also conventional and has not been shown. The tube 1 is composed of metal, preferably aluminum, and carries the microphone 2 on its outer wall so as to transmit to the latter any acoustical signal generated when the canister 3 engages the abutment 4 with impact.

The sound wave of this impact travels significantly faster through the wall of tube 1 than in the gas within the latter. The microphone 2, which may be any of the aforementioned types, delivers its output to a variable-threshold, amplitude comparator Schmitt trigger 5, the arrow 5a indicating the variability of the threshold. The Schmitt trigger 5 may be of the type described in Pulse, Digital and Switching Waveforms, Jacob Millman and Herbert Taub, McGraw-Hill Book Co., 1965, pp. 389–396. The output of microphone 5 thus must exceed the predetermined threshold level before it will energize the trigger circuit 5 to produce an output.

The output of the trigger circuit is applied to one input side of an AND-gate 6 which receives its enabling signal at the other input side from a bistable multivibrator 11, the function of which will be described below. The threshold setin of the Schmitt trigger 5 eliminates spurious operation of the switch device 7 by background noise. The output of the AND-gate 6 is applied to the electronic switch 7 which, in turn, triggers an elapsed-time indicator 16. Electronic switch 7 is a flip-flop of conventional construction, i.e. any of the circuits shown at pp. 364–374 of "Pulse, Digital and Switching Waveforms," supra. The AND-gate may be of the type described at pp. 317–320 thereof. The flip-flop 7 is triggered to deliver an output when the electronic gate 6 is rendered conductive.

To prevent operation of the elapsed-time meter 16 by the sound generated when the pressure lock of the pneumatic tube is opened and the capsule 3 is inserted, I provide an auxiliary switch 8–11 to deliver the enabling signal mentioned earlier. This switch also prevents the sounds generated on movement of the capsule past the microphone from triggering the elapsed-time meter. The auxiliary switch arrangement includes a lamp 8 and a photocell 9 disposed downstream of the microphone 2 on opposite side of the tube 1 and above the water level of the reactor. Windows 17 and 18 are provided in the tube 1 to allow a light beam 19 to extend across the path of the capsule. The photocell 9 is connected to a pulse-forming circuit, e.g. a differentiator (see pp. 27 ff. of Pulse, Digital and Switching Waveforms) the output of which is applied to a flip-flop 11 (op. cit. pp. 364–374) which is connected to the AND-gate 6, when the light beam 19 is interrupted upon passage of the capsule 3 therepast.

The resulting signal is converted at 10 into a pulse which triggers the flip-flop 11 to apply the enabling signal to the AND-gate 6 and prepare the latter for receipt of the sound-response signal from the Schmitt trigger 5. The enabling signal is maintained for a period switch to allow the capsule 3 to strike the stop 4. Since the enabling signal is not applied until after the capsule passes the microphone, the spurious sound of such transit cannot inadvertently initiate operation of the elapsed-time meter.

The auxiliary switch means 8, 9 can, of course, be replaced by any mechanical switch projecting into the path of the sample, e.g. a sensitive or microswitch whose actuating member is deflected by the capsule 3 as it passes.

The improvement described and illustrated is believed to admit of many modifications within the ability of persons skilled in the art, all such modifications being considered within the spirit and scope of the invention except as limited by the appended claims.

I claim:

1. In a reactor, a system for signaling the positioning of a sample at an irradiating station in the nuclear reactor, comprising a metallic tube extending into said reactor to said station; means for introducing a sample into said tube, said tube being provided with an abutment for said sample adapted to generate an acoustical wave in said tube upon impact of the sample with said abutment; an electroacoustical transducer along said tube responsive to acoustical waves transmitted along the walls of said tube for producing an output upon the detection of such waves; and switch means connected to said transducer for indicating the disposition of said sample at said station.

2. The system defined in claim 1 wherein said electroacoustical transducer is a microphone disposed externally of said reactor.

3. The system defined in claim 2, further comprising a triggering circuit between said microphone and said switch means for producing an output signal adapted to trigger said switch means.

4. The system defined in claim 3 wherein said switch means includes a bistable multivibrator connectable to an elapsed-time meter and triggerable by said circuit, said circuit being a Schmitt trigger.

5. The system defined in claim 4, further comprising an AND-gate between said trigger and said multivibrator for connecting said trigger to said multivibrator upon the application of an enabling signal to said AND-gate, an auxiliary switch triggerable by said sample and disposed downstream of said microphone in the direction of movement of said sample toward said location for producing said enabling signal, said auxiliary switch being connected to said AND-gate.

6. The system defined in claim 5 wherein said auxiliary switch includes a further bistable multivibrator connected with said AND-gate and triggerable upon passage of said sample through said tube.

7. The system defined in claim 6 wherein said auxiliary switch includes a mechanical switch along said tube connected to said further bistable multivibrator for triggering same.

8. The system defined in claim 6 wherein said auxiliary switch includes a photocell arrangement athwart said tube forming a beam interruptible by said sample, pulse-forming means connected to said arrangement and to said further bistable multivibrator for generating a pulse upon an interruption of said beam by said sample and triggering said further bistable multivibrator with the latter pulse.

9. The system defined in claim 6 wherein said reactor is a swimming-pool reactor and said tube is aluminum, said microphone and said auxiliary switch being disposed above the water level of said swimming-pool reactor.

10. The system defined in claim 4 wherein said trigger has an adjustable threshold whereby an output signal is developed only when the sound detected by said microphone exceeds a predetermined minimum level.

References Cited
UNITED STATES PATENTS

| | | | |
|---|---|---|---|
| 3,170,152 | 2/1965 | Long | 340—261 |
| 3,237,150 | 2/1966 | Beck et al. | 176—19 |

REUBEN EPSTEIN, Primary Examiner

U.S. Cl. X.R.

340—1